US010337910B2

(12) United States Patent
Eble et al.

(10) Patent No.: US 10,337,910 B2
(45) Date of Patent: Jul. 2, 2019

(54) LABORATORY STAND WITH SET-UP FEET FOR SCALES

(71) Applicant: IKA—WERKE GMBH & CO. KG, Staufen (DE)

(72) Inventors: Erhard Eble, Bad Krozingen (DE); Andreas Zeller, Bad Krozingen (DE)

(73) Assignee: IKA—WERKE GMBH & CO. KG, Staufen (DE)

( * ) Notice: Subject to any disclaimer, the term of this patent is extended or adjusted under 35 U.S.C. 154(b) by 0 days.

(21) Appl. No.: 14/898,029

(22) PCT Filed: Jun. 6, 2014

(86) PCT No.: PCT/EP2014/061835
§ 371 (c)(1),
(2) Date: Dec. 11, 2015

(87) PCT Pub. No.: WO2014/198664
PCT Pub. Date: Dec. 18, 2014

(65) Prior Publication Data
US 2016/0123795 A1    May 5, 2016

(30) Foreign Application Priority Data
Jun. 15, 2013 (DE) .................. 10 2013 010 203

(51) Int. Cl.
*B01L 9/00* (2006.01)
*G01G 23/37* (2006.01)
(Continued)

(52) U.S. Cl.
CPC ............ *G01G 23/3707* (2013.01); *B01L 9/00* (2013.01); *B01L 9/04* (2013.01); *G01G 21/23* (2013.01);
(Continued)

(58) Field of Classification Search
CPC ...... B01F 15/00194; B01F 7/161; B01L 9/00; B01L 9/06
(Continued)

(56) References Cited

U.S. PATENT DOCUMENTS

| 2010/0107752 A1* | 5/2010 | Fernando ............... B01F 7/161 73/149 |
| 2011/0116976 A1* | 5/2011 | Zeller ................. B01F 7/1605 422/119 |

FOREIGN PATENT DOCUMENTS

| EP | 1 959 244 A1 | 8/2008 |
| EP | 2 060 885 A1 | 5/2009 |

(Continued)

*Primary Examiner* — Natalia Levkovich
(74) *Attorney, Agent, or Firm* — Budzyn IP Law, LLC

(57) ABSTRACT

A laboratory stand comprises a holding rod for receiving instruments or measuring devices for treating or examining media or substances or mixtures which may be contained or filled into a vessel arranged next to the holding rod in the usage position, into which vessel appropriate instruments or measuring instruments can engage from above. In order to be able to perform the metering of the substances in the vessel prior to, or during, the processing in a simple manner and/or in order to be able to quickly and reliably identify weight changes, support projections are moveably mounted and provided with, or connected or provided with an operative connection to, a weighing apparatus such that the displacement of the set-up feet, which is increased in the case of increasing weight or reduced in the case of decreasing weight, can be determined as weight change.

15 Claims, 4 Drawing Sheets

(51) Int. Cl.
*B01L 9/04* (2006.01)
*G01G 21/23* (2006.01)
*G01G 21/28* (2006.01)

(52) U.S. Cl.
CPC ........ *G01G 21/28* (2013.01); *B01L 2200/022* (2013.01); *B01L 2300/06* (2013.01)

(58) Field of Classification Search
USPC .................................................. 422/561, 560
See application file for complete search history.

(56) References Cited

FOREIGN PATENT DOCUMENTS

| | | | |
|---|---|---|---|
| FR | 2846632 | A1 | 5/2004 |
| WO | 2009156020 | A1 | 12/2009 |
| WO | 2009156023 | A1 | 12/2009 |

\* cited by examiner

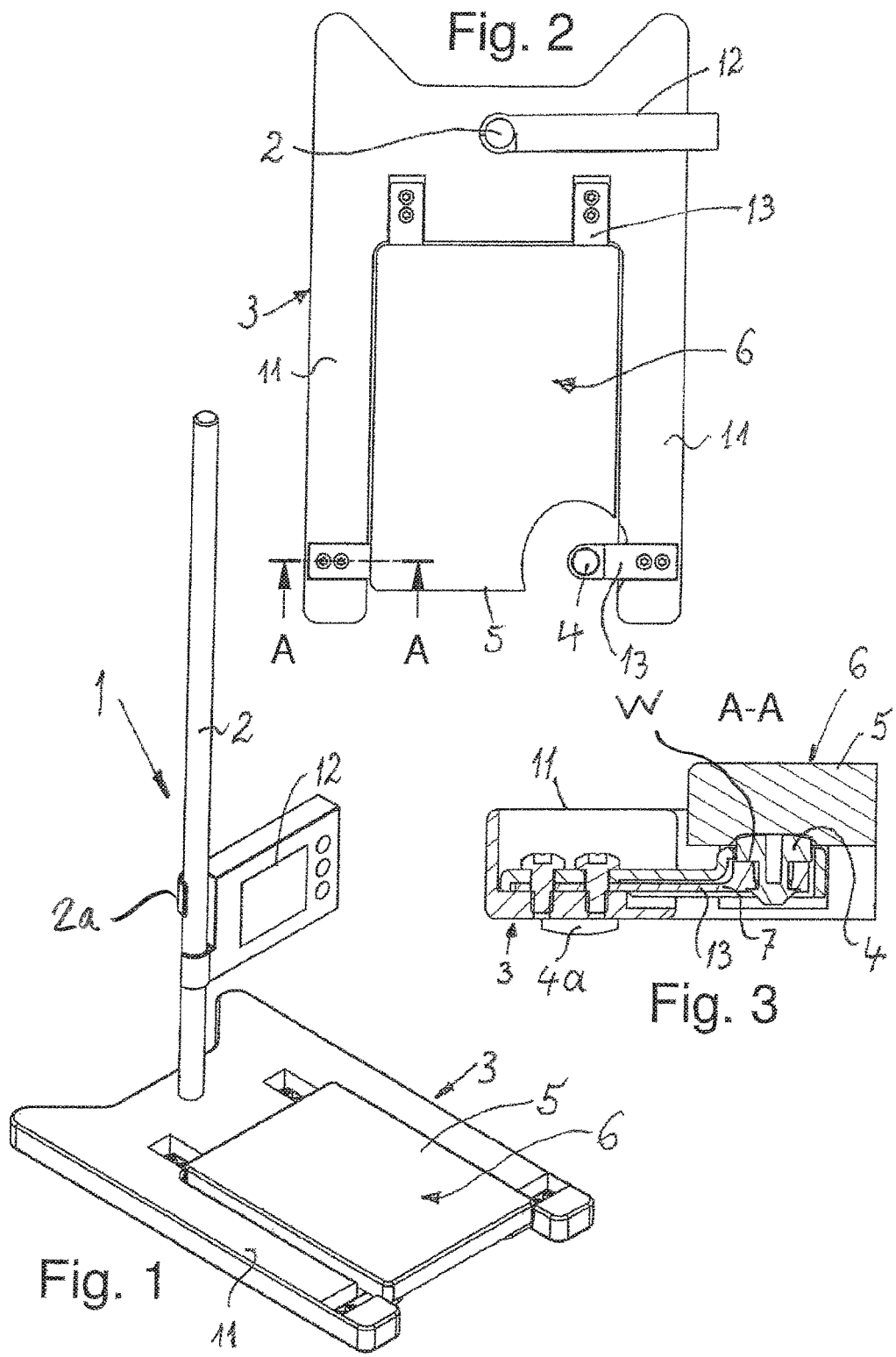

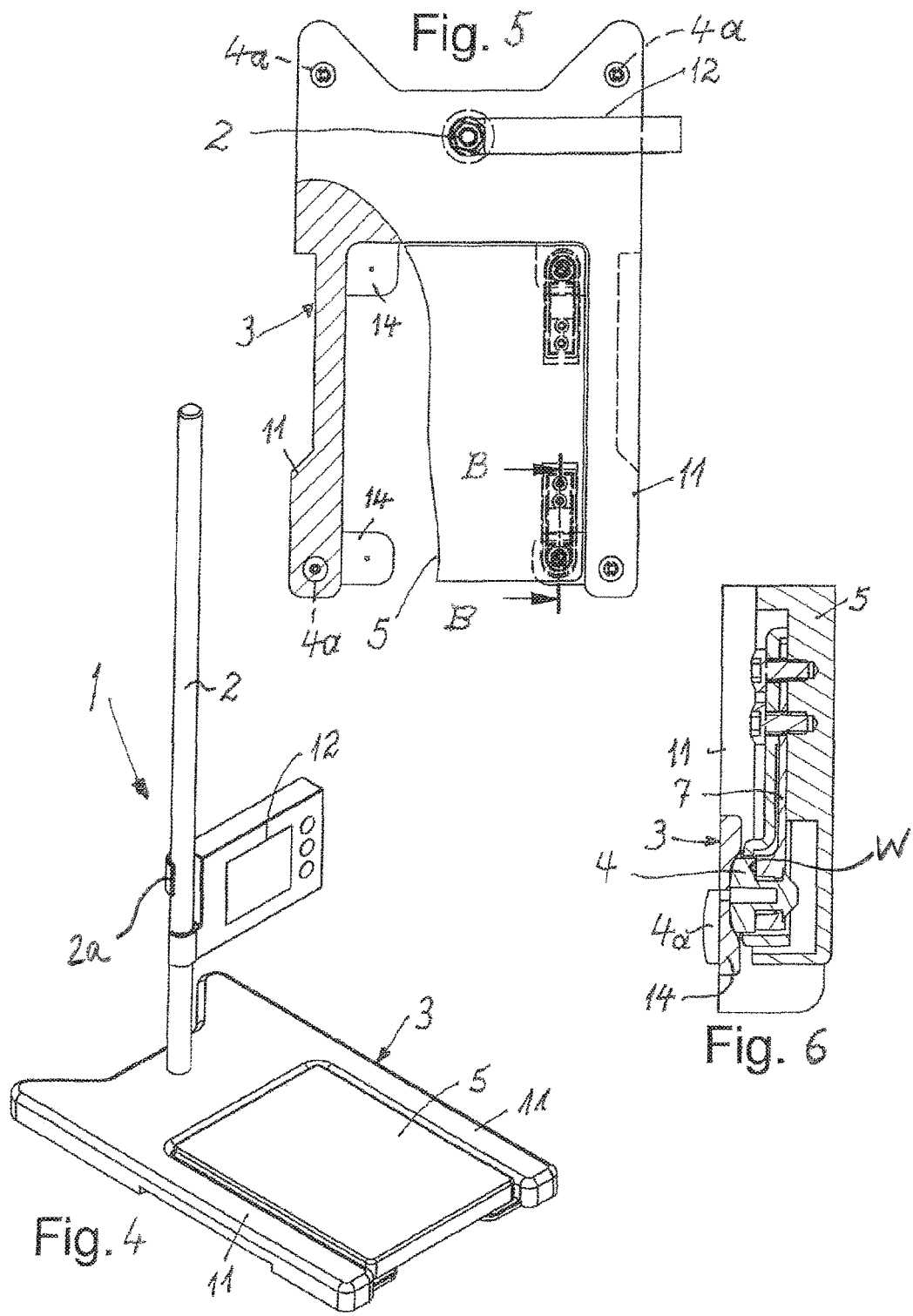

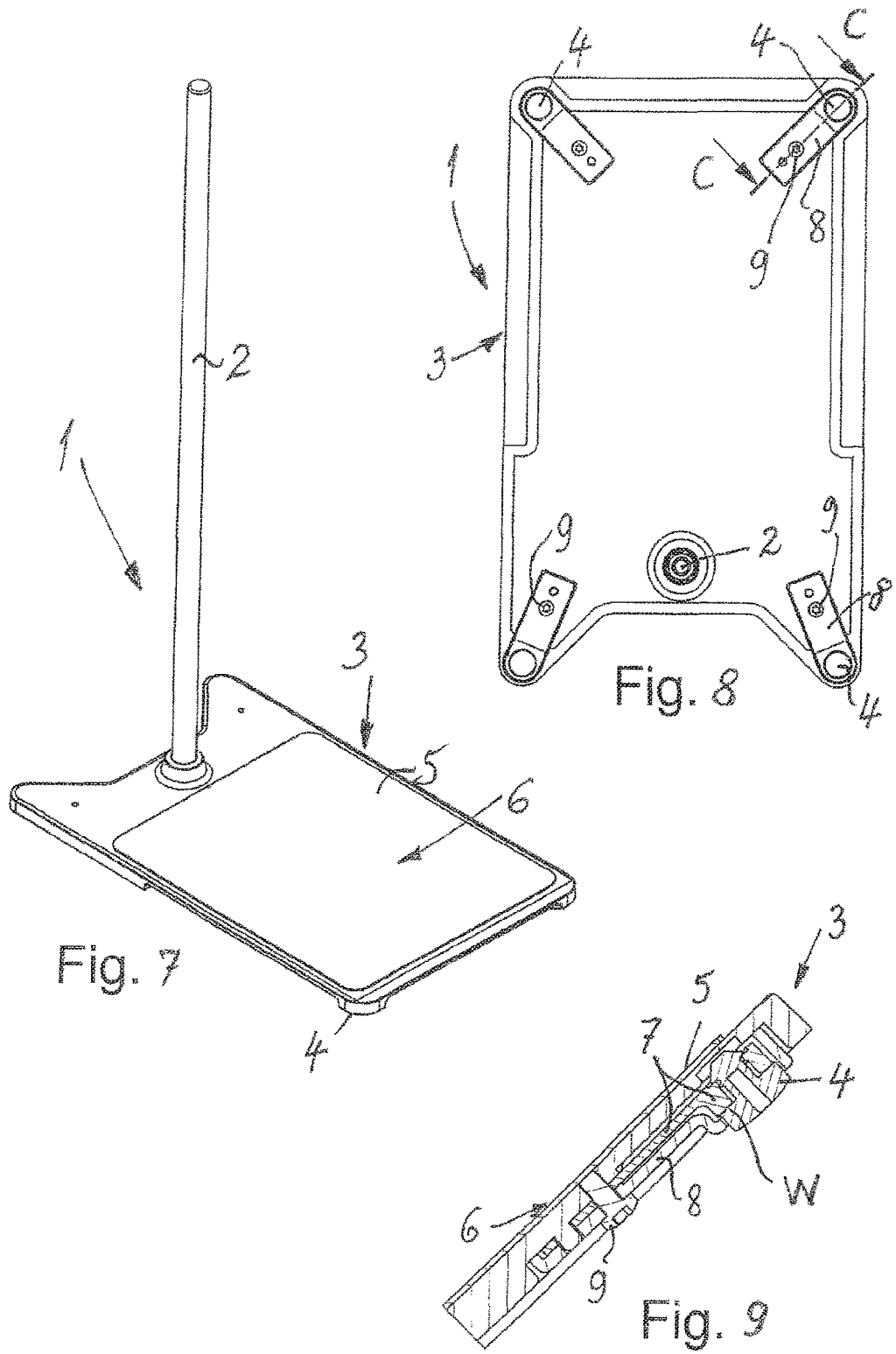

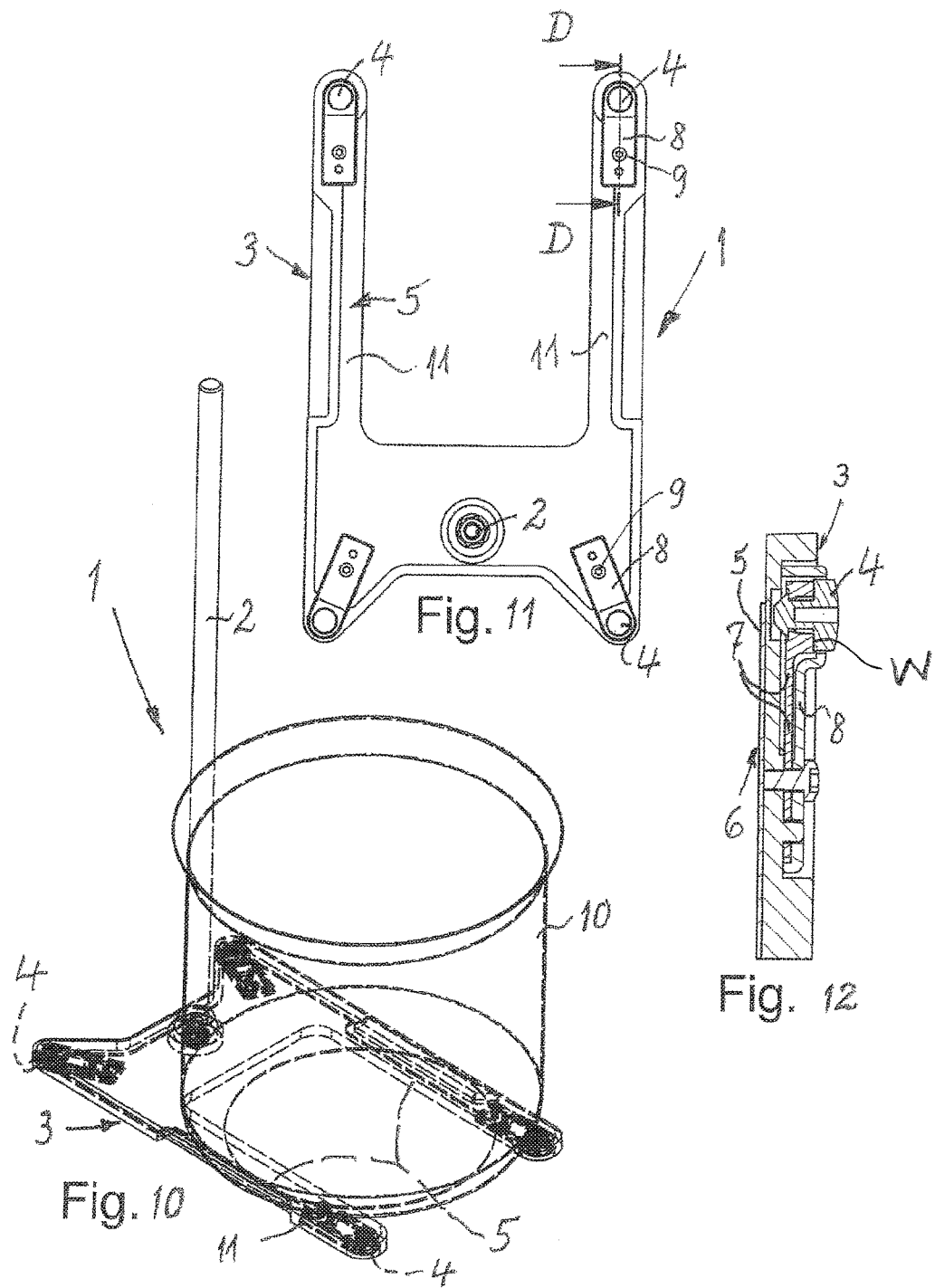

LABORATORY STAND WITH SET-UP FEET FOR SCALES

This application is a National Stage Application under 35 U.S.C. § 371 of PCT Application No. PCT/EP2014/061835, filed, Jun. 6, 2014, which is incorporated by reference herein.

The invention relates to a laboratory stand, called "stand" for short in the following, comprising at least one upwardly extending holding rod, as a rule a vertical holding rod, and a base support supporting this holding rod and with a holder for at least one vessel or laboratory vessel, wherein the base support comprises the holder for the vessel and wherein at least one bracket can be reliably attached or provided so as to be, in particular, releasable and/or height-adjustable, on the holding rod for a mixing and/or stirring and/or dispersing and/or tempering and/or measuring device. Such a bracket is understood to be a bracket which is directly or indirectly connected with the corresponding device or a bracket, with which such a device can be fixed in position.

Stands of this kind are in common use in laboratories, they enable almost any type of vessel to be placed onto the associated holders and the media present in these vessels to be processed or examined or handled or measured by means of different devices, which as a rule are inserted from above into these vessels.

When processing the content of the vessel, a user of such a stand with vessel must correctly meter the content, which may mean rather a lot of work in cases, where the content is to consist of a number of different substances or media.

If such metering, for example while one or more substances are filled into the vessel, requires that the constituents are to be added or metered gradually, the added material has to be weighed or metered or topped up repeatedly, for which in laboratories, in which generic stands are used, a multitude of different weighing apparatuses are available for the most different usages. With certain types of processing topping up might be necessary as early as when processing or measuring is still ongoing, such as for example when evaporating operations are taking place.

Therefore it is the requirement of the invention to propose a stand of the kind defined in the beginning, with which the efficacy of processing the media in the vessels can be improved or accelerated or simplified.

This requirement is met by the means and characteristics of patent claim 1. Realisations and further developments are cited in the dependent claims.

Above all a laboratory stand as defined in the beginning is characterised in that the holder provided on the base support forms a set-up surface for receiving, holding and/or supporting the vessel in the usage position and in that on the underside of the holder facing away from the set-up surface, support projections are provided or arranged, which are flexibly or adjustably or movably mounted transversely to the set-up surface and its underside and in vertical direction against a restoring or spring force, and provided or connected or in operative connection with, a weighing apparatus.

A simple inventive solution may thus provide, for example, a commonly used laboratory stand with a holding rod arranged eccentrically or laterally to the set-up surface, on which a vessel with a content to be processed can be held or positioned. Due to the special support projections and their cooperation with a weighing apparatus it is possible in a simple manner to effect the filling of a vessel and thus the metering of a medium to be added or of constituents thereof without the need for separate scales. Rather the vessel can be in usage position as early as during filling and weighing of the charge.

Furthermore it is possible in a simple manner, to detect, and to record, any changes in weight due to processing the content of the vessel as early as during this processing, and to display and to react to, them. In particular, a medium or a mixture of media or constituents can be very accurately metered and topped up without having to resort to a further scales representing a further instrument or device. Any changes in weight caused by processing can be ascertained and/or displayed immediately by the weighing apparatus.

To achieve results with maximum accuracy it is convenient if all support projections of the stand are configured as support projections arranged underneath on the base support and operatively connected with the weighing apparatus. Individual support projections albeit may be rigid, but this may disadvantageously affect the accuracy of the weighing operation.

One embodiment of considerable advantageous importance and which is worth being independently protected, may consist in that support projections are being provided above the underside of the base support which do not cooperate with the set-up surface of the stand, which are in operative connection with the weighing apparatus and which support the holder for the vessel as a support or as support projections arranged on the underside of the holder.

As a result of this realisation the weighing apparatus associated with the stand is rendered independent of the stand itself, so that only the holder for the vessel and the vessel itself are weighed, but not the entire stand. The set-up plate with vessel therefore can be weighed independently of the stand with the aid of the weighing apparatus provided according to the invention, so that the weighing operations regarding the content of the vessel can be performed more accurately and also faster.

A convenient realisation of this further development of the invention may provide for upwardly extending support projections belonging to the base support to be provided above the underside of the base support, which are flexibly or adjustably or movably mounted in downward direction or vertically downwards against a restoring force or a spring force and which are provided or connected or in operative connection with a weighing apparatus, and which support and/or carry the preferably plate-shaped holder for the vessel in usage position from below. In such a case the weighing apparatus then forms part of the laboratory stand via the support projections, and the plate-shaped holder also belonging to the stand may be placed onto these support projections thus enabling a vessel arranged on this holder and its content to be weighed.

A modified comparably advantageous embodiment may provide for the base support to comprise arms spaced apart from each other, which carry resiliently pivotable holding arms with in usage position upwardly extending support projections, which protrude into a gap provided on the base support, and for an in particular plate-shaped holder to be provided on the support projections, with an upper set-up surface for at least one vessel. A suitable gap may therefore be initially free between spaced-apart arms, which may be engaged into by holding arms with upwardly extending support projections, enabling the holder with the vessel to be placed on top of them and to be weighed due to the connection of the support projections with the weighing apparatus.

A comparably advantageous embodiment which is possible instead of the above-described, or in addition to the above-described, arrangement, may provide for the base support to comprise a gap between two in particular parallel arms and projections on these arms projecting into the gap or its projection, and on which the holder receiving or comprising the set-up surface is positioned in usage position, and for the holder to comprise support projections on its underside, which in usage position are in touching contact with the projections, which support projections are flexibly or adjustably or movably mounted on the holder in an upward or vertical direction against a restoring force or spring force and which are provided or connected with or in operative connection with the weighing apparatus. With such an arrangement the laboratory stand itself is completely independent of the weighing apparatus, i.e. it is excluded from the weighing process and may be in effect, as the case may be, an already existing laboratory stand, insofar as it comprises, in particular, corresponding parallel arms belonging to its base support, wherein there is room in the gap between these arms for positioning the support projections of the holder, which are in operative connection with a weighing apparatus.

It should be mentioned that the support projections provided underneath the holder, which are equipped or connected or in operative connection with, a weighing apparatus can also be placed on the base support itself or an parallel arms forming this base support, in order to create a laboratory stand arrangement which is capable of weighing the vessel with its content without having to remove the vessel from the stand and place it onto separate scales.

Due to the fact that in one realisation of the invention the support projections on the underside of the holder and connected with a weighing apparatus, fit onto the base support itself or onto arms forming the same and can be placed thereon, the range of applications can be further widened because it is possible to utilise already existing laboratory stands together with such a holder comprising support projections as a laboratory stand arrangement according to the invention, which is another favourable factor for the manufacture as a whole.

A further embodiment, which may be envisaged alternatively or additionally, can consist in that the base support itself comprises or forms or carries the set-up surface of the holder. With such an arrangement a compact device is obtained, with which there is no need for a separately movable holder to be assembled or combined with the stand as such.

A modified embodiment of the invention may provide that the holder for the vessel on the base support forms a continuous set-up surface, which is shaped as a plate and which comprises the flexible support projections on its underside and the set-up surface on the top, or that the base support is formed by arms receiving the gap between them, and that the laboratory stand includes a vessel, the bottom surface of which, at least in one direction, has a dimension, which is larger than the inner distance of the arms, wherein the holding rod is preferably arranged eccentrically to the base support and/or the vessel holder.

Such an embodiment therefore provides for an essentially commonly used laboratory stand with a holding rod arranged eccentrically or laterally to the set-up surface, on which normally an associated vessel is held containing the substance or content to be processed. Due to the special support projections which can be used as set-up feet and which cooperate with a weighing apparatus, it is possible in a simple manner to perform the filling of the vessel and thus the metering of the medium to be added without requiring special scales for this purpose. Rather the vessel can already be in usage position, while being filled.

Furthermore with such an exemplary embodiment it is possible in a simple manner, to detect and record any changes in weight occurring during the processing of the medium, to display them for practical purposes and to permit a reaction thereto. In particular, a medium or a mixture of media can be very accurately metered and/or topped up. Any changes in weight occurring due to the processing can be practically immediately ascertained and/or displayed by the weighing apparatus as part of the laboratory stand according to the invention.

It is especially convenient if a part of the flexible mounting of the one or more support projections is in operative connection with the weighing apparatus. This represents a constructionally simple solution for utilising the movability of the support projections in a scales or weighing apparatus.

With a modified embodiment the one or more support projections may consist at least partially of a resiliently flexible material and be provided with a transmission element to the weighing apparatus, which element is connected with the weighing apparatus and movable due to the flexibility of the one or more support projections.

With respect to commonly used or popular laboratory stands with several individual support projections the inventive realisation is convenient because individual support projections respectively cooperate with the, or with one, weighing apparatus via for example respective sensors so that even existing stand models can remain substantially unchanged, but can be provided with the respective movable or flexible support projections with weighing function.

A preferred embodiment may provide for the flexible or adjustable or movable support projections to act upon levers or rockers or end pieces, which cooperate with the weighing apparatus or are in operative connection therewith or, as required, comprise a weighing apparatus.

The levers or rockers or end pieces which can be moved by the support projections may be provided with load cells or measuring strips or piezo elements as components of a weighing apparatus. In this way a weighing function can be realised in a minimum of space.

It is convenient if the load cells of several or of all support projections are combined with a microprocessor or computer in such a way that the loads recorded at individual support projections are added and/or averaged. The user thus immediately obtains weight details or a total weight, or the change in weight can be displayed in a suitable manner or fed to a control device which is able to react to a weight change.

In one realisation of the stand according to the invention provision may be made for an electronic memory for formulae for the purpose of storing material and weight definitions of individual components of mixtures, which can then be processed by the integrated weighing function with the aid of menus. In this way frequently reoccurring processing or mixing operations can be considerably rationalised and accelerated.

A convenient embodiment of the stand according to the invention may consist in that the base support is simultaneously configured or used as the holder for the vessel and, on the topside facing away from the support projections, comprises a set-up surface for the vessel. In this way the base support is provided with a double function.

It is especially convenient if the holder for the vessel which is provided on the base support forms a continuous set-up surface, as a result of which vessels of different dimensions can be received without problems, whereas with a fork-shaped support the vessel must extend beyond the two prongs of the fork.

The base support may be configured as a plate, which on its underside comprises the support projections and on the topside comprises the set-up surface for the vessel. The result is a very simple construction, in which the weighing apparatus or its associated sensors can be received in indentations of the plate or can be arranged in a suitable manner on the plate. Preferably the plate, for stability reasons, is dimensioned with a sufficient thickness so as to allow the support projections and the sensors to be impacted by them, to be arranged in recesses of the plate, conveniently on the underside.

The support projections provided or connected with the weighing function can be arranged on or at rollers so that the stand can be moved. This can be convenient, above all with relatively large stands with correspondingly large vessels, which due to their filling become very heavy. At least one of the rollers may be provided with a brake or releasable lock.

The stand according to the invention with the weighing apparatus acted upon by the support projections as provided according to the invention may comprise at least one weight indicator on the base support or the vessel holder or the holding rod. This allows the user to observe the respective weight change while he is filling the vessel for example, or to observe the original weight and changes thereto as he processes the vessel content. In addition the weight change over time may be recorded in a respective memory.

An additional or modified realisation may provide for the weighing apparatus or the weighing sensors cooperating with the support projections to be configured for forwarding the results of the measurements via radio to, in particular, a device arranged on the laboratory stand, its drive and/or an associated display or an indicating device. In this way the results of, in particular, the weighing apparatus can have influence on the control or regulation of the devices processing the content of the vessel as a reaction to weight changes, and/or display and highlight the results of the measurements at a distance from the laboratory stand, so that a workplace with a laboratory stand according to the invention can be set up very economically permitting the user not to remain in the immediate vicinity of the stand at all times.

A convenient and advantageous realisation of the invention may further provide for the holder of the laboratory vessel be heated. Thus an additional processing component for the content of the vessel may consist in a heating process, for which the weighing function provided according to the invention is particularly convenient because it may be connected with evaporation processes which appear to render a topping-up during processing advantageous or even make it necessary. Therefore the weighing apparatus may come in useful even during the control or regulation of the heating device.

Embodiments of the invention will now be described in detail with reference to the partially schematic illustrations of the drawing, in which:

FIG. 1 shows a perspective view of a laboratory stand according to the invention with an eccentric, vertical holding rod and with a base support supporting the same as well as a holder configured as an independent plate for receiving a laboratory vessel to be placed thereon in usage position, which holder fits in between two parallel arms of the base support, wherein these arms have projections with upright support projections provided on them which are flexibly or movably mounted against a restoring force and which are in operative connection with a weighing apparatus not shown in any detail, and positioned on the plate-shaped holder, FIG. 2 shows a top view of the laboratory stand as per FIG. 1, showing from above, the vessel holder arranged between parallel arms of the base support, wherein a cut-out in the holder permits the view upon an upwardly extending support projection, FIG. 3 shows an enlarged longitudinal section according to cutting line A-A in FIG. 2 through a support projection and the movable lever holding it, which lever can cooperate or can be operatively connected with the weighing apparatus in a manner not shown, FIG. 4 shows a modified exemplary embodiment corresponding to FIG. 1, in which the vessel holder is arranged yet again between two parallel arms of the base support and is resting on the projections protruding into the gap between these arms, FIG. 5 shows a top view in section of the exemplary embodiment as per FIG. 4, wherein due to the partial section this allows a view onto the projections protruding into the gap between the arms, FIG. 6 shows, on an enlarged scale, a section through the arrangement of a support projection and the lever holding it according to the cutting line B-B in FIG. 5, FIG. 7 shows a perspective view analogue FIGS. 1 and 4, of a further modified laboratory stand according to the invention with an eccentric vertical or perpendicular holding rod and a base support supporting this holding rod and configured as a continuous set-up plate for the vessel, which on the underside comprises support projections cooperating with a weighing apparatus, as set-up feet, FIG. 8 shows a view of the underside of the base support of the stand shown in FIG. 7, showing the support projections configured as set-up feet in the four corners of the base support, FIG. 9 shows an enlarged longitudinal section through the base support in the area of a support projection and the lever holding it for connection with a weighing apparatus according to cutting line C-C in FIG. 8, FIG. 10 shows a perspective view of another modified exemplary embodiment of a laboratory stand according to the invention with an eccentric holding rod and with a base support supporting this holding rod, which is formed analogue FIGS. 1 and 4 by two spaced-apart arms with a gap between them, with a vessel positioned directly upon this base support, wherein the lateral dimension or the diameter of this vessel is larger than the distance or gap between the arms so that the vessel can be resting thereon, wherein again support projections are provided on the underside which serve as set-up feet, FIG. 11 shows a view of the underside of the base support of the laboratory stand shown in FIG. 10, and FIG. 12 shows an enlarged longitudinal section through a base support with support projection and resilient lever according to cutting line D-D, in FIG. 11.

In the description below of a number of exemplary embodiments functionally identical parts including those in modified realisations are marked with the same reference symbols.

A laboratory stand marked as a whole with 1 and from now on simply called "stand 1" comprises, in all embodiments, an upwardly extending vertical holding rod 2 and a base support marked as a whole with 3 and supporting this holding rod 2, which base support, on the underside, comprises support projections 4 pointing towards a set-up surface on which the stand 1 can stand, wherein in individual exemplary embodiments support projections have an additional function still to be described in conjunction with a weighing apparatus, i.e. they have two functions, and other exemplary embodiments have support projections 4a for set-up purposes and additionally support projections 4 for weighing purposes.

This stand 1 also has a holder 5 for at least one vessel 10 or laboratory vessel, which varies in the various exemplary embodiments, and which is shown only in FIG. 10 and is to be equally provided in the exemplary embodiments in FIGS. 1, 4 and 7.

The holding rod 2 can comprise, as required, in a manner not shown in detail, releasable bracket 2a for mixing, stirring, dispersing and/or tempering or measuring devices or other working devices, which in particular are releasable or height-adjustable, to allow such processing or measuring devices to be fixed to the holding rod 2 at a height suitable for the vessel 10, in order to act upon and process the content of vessel 10.

In FIGS. 1 and 4 indicating devices 12 are arranged on the holding rod 2, which when used can indicate, as required, ascertained weights and/or temperatures etc.

All exemplary embodiments have in common that the holder 5 provided on the base support 3 forms or comprises a set-up surface 6, which receives, holds or supports the vessel 10 in the usage position. This set-up surface 6 is essentially plane and is realised in such a way that the underside or the bottom of the vessel 10 can be placed on it, wherein in the embodiment according to FIGS. 10 to 12 this set-up surface 6 may be interrupted in a manner to be described. On the underside of the holder 5 facing away from the set-up surface 6, the already mentioned support projections 4 are provided or arranged, which are flexibly or adjustably or movably mounted transversely to the set-up surface 6 and its underside in vertical direction against a restoring force or spring force and which are provided or connected or in operative connection with, a weighing apparatus not shown in any detail. Thus vessels 10 positioned on the holder 5 and its set-up surface 6 and in particular their content can be weighed.

In the embodiments of FIGS. 8 to 12 all support projections 4 are configured as support projections 4 arranged underneath the base support 3 for positioning and weighing, and they are in operative connection with the weighing apparatus. The remaining embodiments are modified in relation thereto, as is revealed in the description below.

In the embodiments of FIGS. 1 to 6 provision is made for support projections 4 to be provided above the underside of the base support 3, which are in operative connection with the weighing apparatus and which support the holder 5 of the vessel 10 (see also FIGS. 1 to 3) or support projections 4 arranged on the underside of the holder 5 and protruding downwards in relation thereto, which again are flexible and in operative connection with the weighing apparatus. In addition provision is made for support projections 4a independent therefrom, which protrude downwards and serve as, in particular, non-flexible feet.

In detail, the exemplary embodiment in FIGS. 1 to 3 provides that above the underside of the base support 3 support projections 4 pointing upwards are provided, which are provided in addition to the support projections 4a functioning as feet and supporting the stand 1 as such. These upwardly extending support projections 4 are flexibly or adjustably or movably mounted in downward or vertical direction downwards against a restoring force or spring force and are as already mentioned provided or connected or in operative connection with, a weighing apparatus not shown in detail. In contrast to the exemplary embodiments shown in FIGS. 7 to 12 these downward-pointing support projections 4 essentially support the plate-shaped holder 5 of the vessel 10 and support the same from below, when in usage position. This arrangement therefore deviates from that shown in FIGS. 7 to 12, where the base support 3 itself comprises or forms the set-up surface 6 of the holder 5.

FIGS. 1 to 6 show an arrangement, where the base support 3 comprises arms 11 spaced apart from each other, as is also provided in the exemplary embodiment shown in FIGS. 10 to 12. Whilst, however, in the embodiment of FIGS. 10 to 12 the topsides of the two arms 11 form the set-up surface 6 which is interrupted by the gap, the embodiment as per FIGS. 1 to 3 provides for the spaced-apart arms 11 to support resilient pivotable holding arms 13 protruding into the gap between them, with upwardly extending support projections 4 arranged thereon, wherein the support projections 4 have the here plate-shaped holder 5 representing the set-up surface 6 for the vessel 10 positioned on them in usage position. In particular in FIG. 3 it can be recognised that the upwardly extending support projection 4 engages into an indentation on the underside of the holder 5, thereby forming a form-lock. Nevertheless the holder 5 is easy to remove.

In FIGS. 1 and 2 it can be clearly seen that the resilient arms 13, on the one hand, are facing each other near the end of the arms 11, whilst near the holding rod 2 they are parallel to each other and arranged at right angles to the first mentioned holding arms 13.

A similar embodiment, but modified as regards the arrangement of the flexible support projections 4, which are in operative connection with a weighing apparatus, is shown in FIGS. 4 to 6. Here too, the base support 3 comprises a gap between two arms 11 extending in parallel in the embodiment with projections 14 on these arms 11 protruding into the gap, which projections are comparable to the holding arms 13 of the embodiment according to FIGS. 1 to 3, but which only serve as a passive support, for the holder 5, which receives and comprises the set-up surface 6, is positioned on these in usage position, and which on the underside, when the projections 14 are in usage position, comprises support projections 4 in touching contact, which in upward or vertical direction are flexibly or adjustably or movably mounted against a restoring force or spring force on the holder 5 and are provided or connected or in operative connection with, the weighing apparatus.

Whilst in the embodiment according to FIGS. 1 to 3 the support projections 4 serve as support for the holder 5 and are flexible in a downward direction, the support projections 4, in the embodiment according to FIGS. 4 to 6, are arranged on the underside of the holder 5 itself and are flexible in an upward direction relative to the same, thus facilitating the weighing operation. In FIG. 6 it can be recognised that in this case the support projections 4 now positively engage from above in an indentation on the projections 14, in order to effect adjustment and positioning or centering of their position.

A modification would appear to be feasible insofar as the support projections 4 on the underside of the holder 5 and the plate-shaped set-up surface 6 connected with a weighing apparatus could directly fit onto the base support 3 or the arms 11 of the stand 1 forming the same and positioned thereon, so that such arms 11 are totally omitted, or the holding arms 11 or projections 14 protruding into a gap on these arms are omitted. Such an embodiment too, where the holder 5, so to speak, is positioned on the set-up surface 6 in FIG. 7 and comprises support projections 4 on its underside which are connected with a weighing apparatus, could be utilised to exclude the stand 1 itself from the weighing operation, i.e. could be used to realise the weighing operation in such a manner that it becomes independent of the stand 1 itself.

All exemplary embodiments have in common that the support projections 4 connected with the weighing apparatus consist, at least partially, of a resiliently flexible material or are provided with a transmission element to the weighing apparatus, which is connected to the weighing apparatus and movable due to its flexibility, wherein these flexible or adjustable or movable support projections 4, in all embodiments, have or act upon, movable levers 7 or rockers or end pieces, which cooperate with the weighing apparatus or are in operative connection or connected with, the weighing apparatus. In other words, the flexible support projections 4 are flexible via these levers 7 on the one hand and on the other, are connected with the weighing apparatus.

For example the levers 7 or rockers or end pieces which can be moved by the support projections 4 may be provided with load cells or measuring strips or piezo elements as components of a weighing apparatus W.

The load cells of several or all support projections 4 in all embodiments can be combined, in a manner not shown in detail, with a microprocessor or computer in such a way that the weights recorded on individual support projections 4 are added and/or averaged.

Furthermore, an electronic memory may be provided for formulae, in which material and/or weight definitions of individual components of mixtures are stored, which can then be processed by the integrated weighing function under the control of menus.

It should also be mentioned that the support projections 4a provided or connected with, the weighing function, insofar as they also function as set-up feet, may be arranged on or at rollers so that the stand 1 can be moved.

As already mentioned the embodiments depicted in FIGS. 1 to 6 show that the stand 1 may comprise an indicating device and in particular a weight indicator 12 on the holding rod 2. This may, of course, also be provided in the embodiments according to FIGS. 7 to 12.

The weighing apparatus or weighing sensors cooperating with the support projections 4 may be configured for forwarding the results of the measurements via radio, and in particular for forwarding these results to, in particular, a device arranged on the laboratory stand 1 or its holding rod 2, such as a stirrer, mixer etc., or to its drive and/or to a display 12 associated with it, so that the weighing results can be easily evaluated without requiring any costly wiring.

Finally it should be mentioned that the holder 5 for the vessel 10 may be configured to be heatable, wherein, as the case may be, heating may be controlled or regulated via the weighing apparatus or vice versa.

The laboratory stand 1 comprises a base support 3 and support projections, which themselves can be set-up feet or are provided in addition to such set-up feet. Furthermore the laboratory stand 1 includes a holding rod 2 for receiving devices or measuring devices 12 for processing or examining media or substances or mixtures, which may be contained in a vessel 10 or can be filled into the same, which in usage position is arranged next to the holding rod 2 and into which respective devices or measuring devices can engage from above. In order to simplify the metering of substances into the vessel 10 prior to or during processing and/or in order to be able to quickly and reliably recognise any weight changes, support projections 4 are movably mounted and provided or connected or in operative connection with, a weighing apparatus so that a displacement of the set-up feet 4, which increases for an increase in weight or decreases for a decrease in weight, can be determined as a weight change.

The invention claimed is:

1. A laboratory stand (1) comprising:
   at least one upwardly extending holding rod (2);
   a base support (3) supporting the holding rod (2);
   a holder (5) including a support surface (6) for supporting at least one vessel (10) in usage position;
   base support projections (4a) extending from an underside of the base support (3) to act as supporting feet for the base support (3);
   support projections (4) provided on an underside of the holder (5) facing away from the support surface (6), wherein the support projections (4) are mounted so as to support the holder (5) and be moveable relative to the base support (3); and
   means for weighing,
   wherein the support projections (4) are provided to protrude from the underside of the holder (5) spaced from vertical alignment with the base support (3), the support projections (4) protruding from the underside of the holder (5) so as to be above a plane coincident with the underside of the base support (3), the support projections (4) being in operative connection with the means for weighing.

2. The laboratory stand according to claim 1, wherein the base support projections (4a) which protrude from the underside of the base support (3) are mounted against a restoring force and are operatively connected with the means for weighing.

3. The laboratory stand according to claim 1, wherein the base support (3) comprises spaced-apart arms (11) which support resilient pivotable holding arms (13) protruding into a gap defined between the spaced-apart arms (11).

4. The laboratory stand according to claim 1, wherein the support projections (4) consist at least partially of a resiliently flexible material.

5. The laboratory stand according to claim 1, wherein the support projections (4) act upon movable levers (7) which are in operative connection with the means for weighing.

6. The laboratory stand according to claim 5, wherein the levers (7) are provided with one or more of load cells, measuring strips, and piezo elements, as components of the means for weighing.

7. The laboratory stand according to claim 6, wherein the load cells of several or all of the support projections (4) are combined with a microprocessor or computer in such a manner that the weights recorded at individual support projections (4) are added or averaged.

8. The laboratory stand according to claim 7, further comprising an electronic memory for formulae, in which at least one of material and weight definitions of individual components of mixtures are stored and can be processed by the integrated weighing function under menu control.

9. The laboratory stand according to claim 1, further comprising at least one weight indicator (12).

10. The laboratory stand according to claim 1, wherein the means for weighing is configured for forwarding results of measurements via radio.

11. The laboratory stand according to claim 1, further comprising at least one bracket releasably attached to the holding rod (2).

12. The laboratory stand according to claim 1, further comprising at least one bracket attached to the holding rod (2) so as to be height-adjustable relative thereto.

13. The laboratory stand according to claim 3, wherein the support projections (4) are supported by the holding arms (13).

14. The laboratory stand according to claim 5, wherein the base support (3) comprises spaced-apart arms (11) which support resilient pivotable holding arms (13) protruding into a gap defined between the spaced-apart arms (11), the levers (7) being supported by the holding arms (13).

15. The laboratory stand according to claim 14, wherein the support projections (4) are supported by the holding arms (13) so as to act upon the levers (7).

* * * * *